United States Patent [19]
Griffith

[11] 4,066,205
[45] Jan. 3, 1978

[54] BIN BOX

[75] Inventor: Harold J. Griffith, Galesburg, Ill.

[73] Assignee: Alton Box Board Company, Alton, Ill.

[21] Appl. No.: 743,683

[22] Filed: Nov. 22, 1976

[51] Int. Cl.$^2$ .............................................. B65D 5/72
[52] U.S. Cl. .................................. 229/17 B; 206/626
[58] Field of Search ........................... 229/17 B, 51 D

[56] References Cited
U.S. PATENT DOCUMENTS

| 340,904 | 4/1886 | Auchterlonie | 229/17 B UX |
| 2,676,746 | 5/1954 | Kellog et al. | 229/17 B |
| 2,847,153 | 8/1958 | Guyer et al. | 229/17 B |
| 3,335,940 | 8/1967 | Dykes | 229/17 B X |

Primary Examiner—Davis T. Moorehead
Attorney, Agent, or Firm—Paul M. Denk

[57] ABSTRACT

In a bin box formed of corrugated board and shaped having upper, bottom and a pair of side walls, being folded into the tubular form, with a series of flaps provided at the back end to provide closure thereat, and a pivotal panel foldably connected to the bottom wall at the opposite or front end of the box, with said panel having lateral flaps foldably connected to either side, with said flaps being arranged interiorly of the box and adjacent its side walls, with protruding portions provided upon the upper end of each lateral flap so as to limit the extent of the outward pivotal disposition of the pivotal panel. Another flap connects with the upper wall at this front of the box, with said flap normally providing for full closure across this end of the box, but also includes a line of separation so that a portion of said flap can be removed, leaving a marginal flap that functions as a display panel for the box when used for marketing of granular or bulk materials.

4 Claims, 5 Drawing Figures

BIN BOX

BACKGROUND OF THE INVENTION

This invention relates generally to corrugated paperboard boxes, and more particularly pertains to a bin box useful for supporting bulk materials.

Various styles of containers are available that are useful for holding a variety of components or materials, and when they reach a market destination have their top wall either removed or folded back so as to dispose their contents for sale. In addition, various types of dispensers, usually formed of metal, include a pivotal front panel, and wherein materials stored therein may be removed at will. But, the current invention incorporates certain structural features of the prior art, and modifies them to the extent that a foldably connected front pivotal panel may be maintained in closure when the box is used for shipment of bulk material, such as seeds, cereals, powders, peanuts, and similar type materials, thereby allowing the bulk contents to reach their destination without any loss of content, and after the boxed material reaches the market shelf, its pivotal panel may be pulled downwardly into a display disposition maintaining an inclined angular relationship so that the bulk material may freely flow forwardly and be scooped or dispensed therefrom at the desire of the customer.

It is, therefore, the principal object of this invention to provide a box that is useful for conveying bulk materials, but secondly, may double as a display bin from which the bulk materials may be dispensed or removed by the customer.

A further object of this invention is to provide a bin box incorporating structure that fully supports at an inclined position a pivotal front panel that supports a quantity of the retained bulk material in full convenient view of the shopper.

A further object of this invention is to provide a bin box having a foldable and pivotal front panel that may be structurally retained at an inclined position through the use of integral cooperating components yet arranged internally of the box's enclosure.

Yet another object of this invention is to provide a bin box that can be formed in its entirety from a unitary corrugated paperboard blank.

Another object of this invention is to provide a blank for a bin box that can be easily folded into its useful configuration and easily manipulated into its display position.

These and other objects will become more apparent to those skilled in the art upon reviewing the summary of this invention, and upon undertaking a study of the description of the preferred embodiment in view of its drawings.

SUMMARY OF THE INVENTION

This invention contemplates a paperboard blank that is formed of a unitary sheet of material, precut and prescored, so as to provide a series of freely foldable and pivotal panels and flaps, connected together through a series of fold lines that allow the box to be easily assembled into its retainer configuration, but yet then further manipulated into a bin box type display that incorporates inherent structural integrity that enhances both the full support and its useful life while its bulk contents are being dispensed. The box includes a series of upper, bottom and a pair of side walls that are folded in the usual manner into the tubular form, with the series of end flaps provided at the back end of the said tubular form of the box that when folded provide for full closure of the box at this end. At the other end of the box there is provided a pivotal panel that is foldably connected to the bottom wall of the same, and said panel includes at each of its side edges a foldable lateral flap that folds back into and is normally disposed slidably adjacent to the internal surfaces of the side walls of the box. A protruding portion is provided integrally upon the upper inserted end of each lateral flap, or that end of the flap arranged approximately opposite from its foldable connection with the pivotal panel, so that as the said panel is pulled outwardly to provide an opening into the box, the protruding members come into contact with and wedge against the interior surface of the upper wall of the box thereby preventing any further opening of the pivotal panel beyond an inclined position with respect to its bottom wall. In this position the various bulk materials that lade the interior of the box are free to flow forwardly against the angularly arranged pivotal panel, thereby disposing such materials to the full view of anyone desiring to see the same. In addition, during shipment, the box normally includes a second full closure flap that foldably connects with the upper wall of the same end of the box, and which flap normally provides full coverage over the pivotal panel when it is folded into a closed position. But, when this second flap is pulled open, thereby disposing the panel for its pulling open, this second flap may be severed a short distance below its fold line and thereby provide a convenient panel upon which product information may be displayed or advertised.

BRIEF DESCRIPTION OF THE DRAWINGS

In the drawings, FIG. 1 discloses an isometric view of the bin box in its fully closed position, as when laden with bulk materials.

DESCRIPTION OF THE PREFERRED EMBODIMENT

Figure 1:
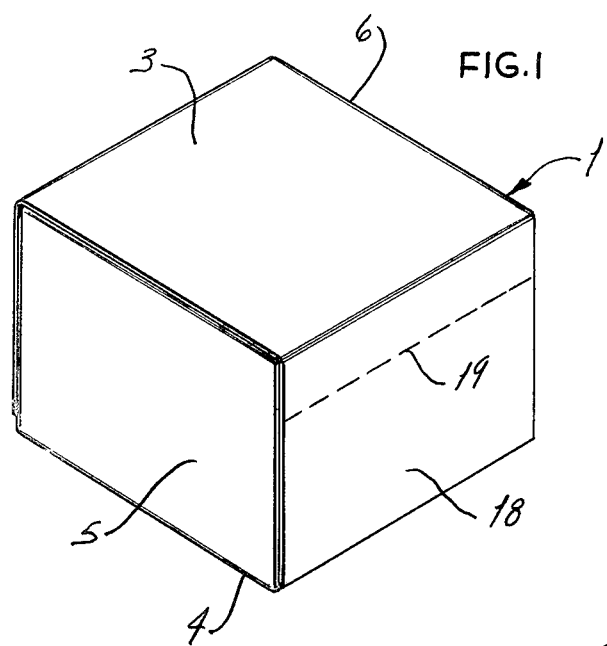
Figure 2:
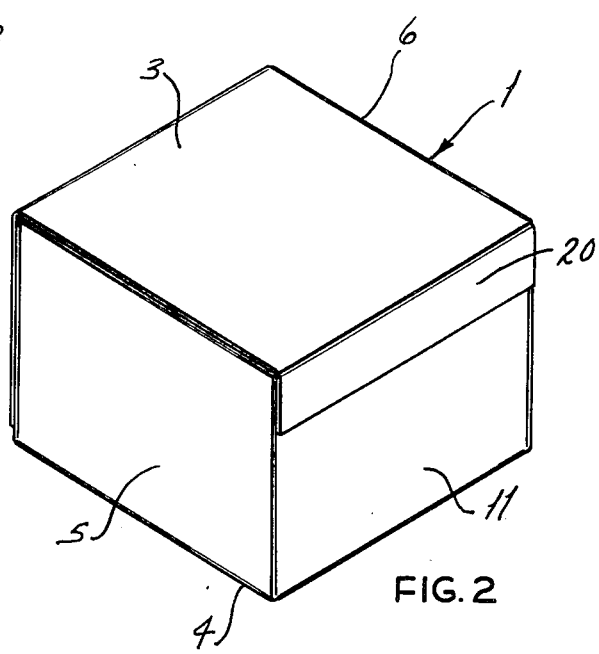
FIG. 2 discloses a similar view of the bin box shown in FIG. 1, but with its closure flap being severed to provide a remaining display panel at the upper frontal portion of said box.
Figure 4:
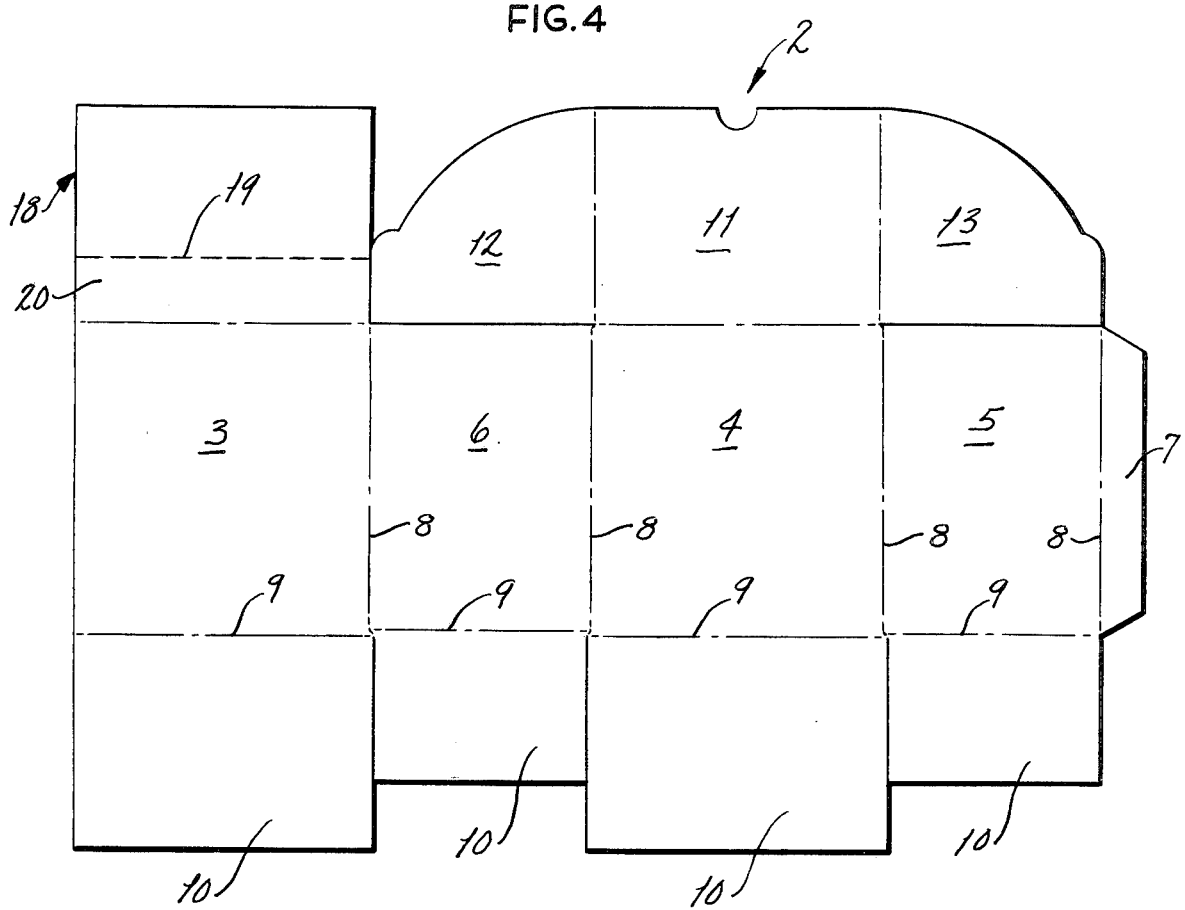
FIG. 4 discloses a unitary blank for the bin box of this invention.

In referring to FIGS. 1 and 2, there is disclosed the bin box 1 of this invention which is formed, preferably, from a unitary blank of corrugated paperboard, such as the blank 2 as shown in FIG. 4. The bin box includes an upper wall 3 a bottom wall 4, and a pair of side walls 5 and 6, which when all connected together provide a tubular form for the box, as shown. A manufacturer's joint 7 is useful for connecting within and to the upper wall 3 so as to facilitate the hold of the bin box when folded into its tubular configuration. All of these side walls, upper wall, bottom wall, and manufacturer's joint are connected together through a series of fold lines, as at 8. Foldably connecting along the series of formed fold lines 9 are a plurality of end flaps 10, which have the usual width and are regularly slotted so that said flaps may be conveniently folded to provide a complete end closure for the back end of the box.

Figure 3:
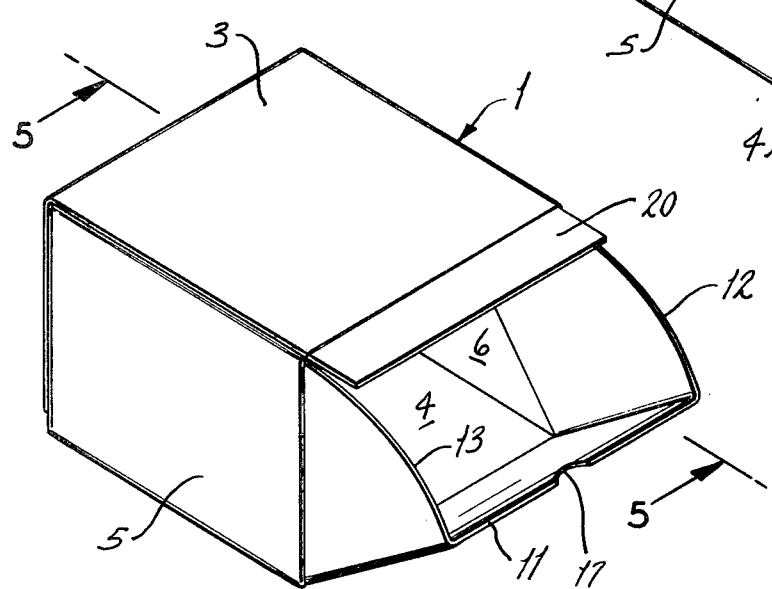
FIG. 3 discloses the bin box with its pivotal panel disposed opened so as to conveniently display any bulk materials disposed therein.
Figure 5:
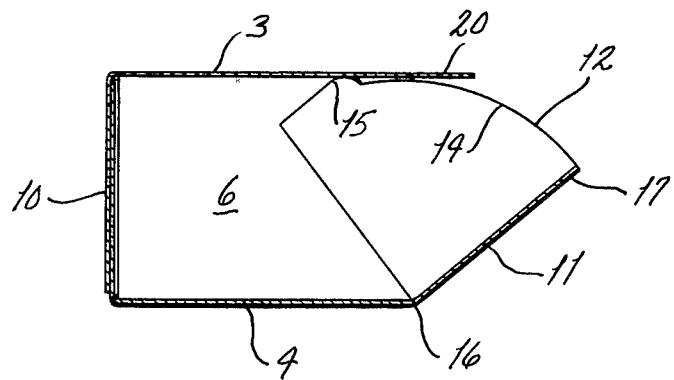
FIG. 5 provides a sectional view of the bin box taken along the line 5—5 of FIG. 3, disclosing the protruding portion of one of the lateral flaps wedging against the interior of the upper wall of the box so as to prevent any further opening of its pivotal flap.

At the opposite or frontal end of the box there is provided a pivotal panel 11 that functions for the dual purpose of providing closure for this end of the box, while at the same time, and as can be seen in FIG. 5, furnishes an inclined support for any of the granular material contained within the box for its display. This pivotal panel or flap 11 has foldably connected to both of its sides the lateral flaps 12 and 13, and which lateral flaps normally extend into the interior of the bin box and maintain a contiguous relationship against the interior of the side walls 5 and 6 of the said box. These lateral flaps 12 and 13 each have a curved edge configuration, as can be seen at 14 in FIG. 5, which just clears the interior of the upper panel 3, as when the panel 11 is being pivoted from its closed position, as shown in FIG. 2, to its inclined or angulated displaying position, as shown in FIG. 3. But, the upper reaches of these lateral flaps 12 and 13 each incorporate a protruding portion, one as shown at 15, which is intended to come into contact with the wedge against the inner surface of the upper wall 3, thereby limiting the extent to which the pivotal panel 11 may be pulled outwardly into its display location. The dimension from this protruding portion 15 to the point of foldable connection 16 between the panel 11 and the bottom wall 4 is greater, as can be seen, than the dimension between the upper wall 3 and the bottom wall 4 of the container, so that the protruding portion does come into contact and wedge against the interior of the upper wall 3 at a region well interior of the frontal edge of this said upper wall. As can be seen, and depending upon the design and dimensions given to the protruding portion 15, the pivotal flaps 11 will maintain an angular relationship forwardly or in front of the bin box, and in the preferred embodiment, this angular relationship is somewhere in the vicinity of approximately 150° with respect to the bottom wall 4.

The pivotal flap 11 includes at its upper edge a slight cut out portion 17 which is useful for facilitating the insertion of a finger into the bin box in order that this pivotal panel may be pulled open, as when it is desired to display its bulk materials therein, or to dispose the same for scooping. But, in certain instances, it may be desirable that the pivotal panel 11 have a shorter length than the dimension between the upper and bottom walls 3 and 4, so that one may easily grasp the upper edge of this panel 11 and pull it forwardly, eliminating the need for any finger slot 17 as shown. But, regardless of the dimension provided for this panel 11, the dimension between the protruding portion 15 and the location of the fold line 16 will remain at least of a dimension that exceeds the space between the upper and bottom walls 3 and 4 so as to insure that the wedging action between the protruding portion 15 and the upper wall 3 is sufficient to achieve the desired wedging action that retains said panel 11 at a desired angulated position in front of the bin box, as when it is used for displaying purposes at the marketplace.

Foldably connected to the frontal edge of the upper wall 3 is a closure flap 18, which is normally arranged, during box shipment, in an overlying relationship to provide coverage upon the panel 11, as shown in FIG. 1. Preferably, but not necessarily, this closure flap or panel 18 may include a marked line of separation, such as a printed line or perforated score line, as at 19, upon the same, which indicates where this flap may be severed, with this bottom portion removed, thereby retaining only a short segment of the flap 18 which may find utility in functioning as a shortened display panel 20, as can be seen in FIG. 2. Once the lower segment of this flap 18 is removed, its display formed panel 20 may be lifted up, and the pivotal panel 11 pulled forwardly as through the insertion of one's finger through the slot 17.

Variations or modifications to the design of this bin box may occur to those skilled in the art upon reviewing the subject matter of this disclosure. Any such modifications, if within the spirit and scope of this invention, and encompassed by the claims appended hereto, are intended to be protected by any patent issuing hereon. The disclosure of the preferred embodiment is set forth for illustrative purposes only.

Having thus described the invention what is claimed and desired to be secured by Letters Patent is:

1. A bin box for supporting bulk material and formed having an upper, bottom, and a pair of side walls connected together and folded to create a tubular form, a series of flaps connecting to one end of the tubular form and folded to provide closure at said end of the box, a pivotal panel foldably connected to the bottom wall at the opposite end of the box, a pair of lateral flaps, one of each lateral flap foldably connected to a side of said pivotal panel, said lateral flaps normally arranged within the tubular form of the box and adjacent to the said side walls, said pivotal panel completely covering the opposite end of the box when said panel is pivoted into closure, at least one portion being provided upon the upper end of each lateral flap and provided for wedging against the interior of the upper wall as the pivotal flap is pulled to limit the extent of its opening, said pivotal panel completely covering the opposite end of the box when said panel is pivoted into closure, and another flap foldably connecting to the upper wall at the opposite end of said box, said flap providing coverage over the pivotal panel when the box is maintained in closure.

2. The invention of claim 1, wherein said bin box is formed of corrugated paperboard.

3. The invention of claim 1 wherein said other flap is capable of being shortened for functioning as a display panel for the bin box.

4. The invention of claim 1 wherein the distance from the portions to the location of connection of the pivotal panel to the bottom wall exceeds the dimension between the upper and bottom walls of the said box.

* * * * *